US005518833A

United States Patent [19]
Repplinger et al.

[11] Patent Number: 5,518,833
[45] Date of Patent: May 21, 1996

[54] NONWOVEN ELECTRODE CONSTRUCTION

[75] Inventors: Ronald S. Repplinger, Carl Junction; Dwaine K. Coates, Joplin, both of Mo.

[73] Assignee: Eagle-Picher Industries, Inc., Cincinnati, Ohio

[21] Appl. No.: 248,868

[22] Filed: May 24, 1994

[51] Int. Cl.$^6$ .................................................. H01M 4/38
[52] U.S. Cl. ........................... 429/59; 420/900; 428/605; 428/608
[58] Field of Search ........................... 429/59, 235, 236; 420/900; 428/605, 608

[56] References Cited

U.S. PATENT DOCUMENTS

| | | | |
|---|---|---|---|
| 4,447,509 | 5/1984 | Maskalick | 429/235 |
| 4,589,891 | 5/1986 | Iniotakis et al. | 428/608 X |
| 4,717,629 | 1/1988 | Ishikawa et al. | 420/900 X |
| 5,246,797 | 9/1993 | Imhof et al. | 429/235 X |
| 5,387,478 | 2/1995 | Muta et al. | 429/59 |

*Primary Examiner*—Stephen Kalafut
*Attorney, Agent, or Firm*—Wood, Herron & Evans

[57] ABSTRACT

A negative electrode, and hydrogen storage cell incorporating the negative electrode, wherein the negative electrode is a porous mat of conductive fibers. These fibers, which are capable of reversible hydrogen storage, have high aspect ratios, typically greater than 1,000, and have diameters in the range of about 1 micron to about 20 microns. The porous mat negative electrode may optionally be sintered.

20 Claims, 1 Drawing Sheet

NONWOVEN ELECTRODE CONSTRUCTION

FIELD OF THE INVENTION

The invention relates to a novel hydrogen storage electrode and cell made therefrom, wherein the electrode has a fibrous, nonwoven mat structure, capable of the reversible, electrochemical adsorption and desorption of hydrogen.

BACKGROUND OF THE INVENTION

Various rechargeable battery systems exist for energy storage based on the reversible storage of hydrogen. These systems include nickel-metal hydride, nickel-hydrogen, silver-metal hydride, silver-hydrogen and hydride-manganese dioxide. Further, various metallic alloys are known to reversibly store hydrogen in electrochemical batteries. Materials having this capability include nickel-titanium, iron-titanium, lanthanum-nickel, mischmetal-nickel, cerium-nickel, magnesium-copper, samarium-cobalt, and a variety of other substituted alloys.

Current state of the art methods for preparing working electrodes from hydrogen storage alloys consist of the combination of sintering and the use of binders, or binders alone, to hold the hydrogen storage alloy electrode materials together. In order to produce an electrode, the hydrogen storage alloy must be processed into a finely divided powder with a small particle size which is typically less than 100 mesh, prior to any electrode processing. The powder particles are essentially spherical in geometry. Close-packing spherical particles allows minimal contact between the particles, resulting in poor conductivity and reduced structural integrity. Further, this method of manufacture has certain additional disadvantages. Hydrogen storage alloys are extremely hard and brittle and are not conducive to the preparation of finely divided powders. Further, the powder preparation step involves the use of hydrogen which embrittles the powder. Subsequent high speed grinding adds processing steps and therefore additional costs to the material. After preparation of the finely divided powder, this material can be readily oxidized, corroded, and may become passivated in the presence of atmospheric oxygen and moisture. As a result, satisfactory material handling in a battery manufacturing operation presently requires complicated processing steps.

Also, the use of binders in the electrode has disadvantages. Binders in a sintered electrode design are selected to burn off in the high temperature sintering operation. However, no material burns without leaving some residue. The binder residue left in the electrode structure affects the electrode and battery, affects performance, and provides micro-sites in the electrode which have an increased susceptibility to corrosion when contacted by the battery electrolyte. Binders used in non-sintered electrodes remain in the electrode throughout the electrode's operational life. These binders are non-conductive materials, for example, polytetrafluoroethylene, polyethylene, methyl cellulose, latex and other polymers and plastics. These materials are known to increase the impedance of the electrode and decrease the wetting ability of the electrode. Both effects are detrimental to electrode performance.

In the manufacture of an electrochemical battery, the alloys of the type discussed above are formed into the negative electrode. As hydrogen is absorbed into the metallic lattice of the negative electrode during charging, the structure necessarily expands in three-dimensional degrees of freedom resulting in volume expansion of both the electrode material and structure. This change in volume is a characteristic of the alloy and can be as much as 20%. As the metallic lattice expands, metal-to-metal bonds within the electrode structure are broken, resulting in decreased physical contact between alloy particles, decreasing both conductivity of the electrode structure and mechanical strength.

Hydrogen uptake and release, known also as the hydriding and dehydriding process, corresponds to the charging and discharging of the electrodes in the battery as the volume of the alloy changes. During this process, the metal particle-to-particle bonds are stress-fractured due to the brittle nature and inherent hardness of the hydride alloys. This problem also extends to the sintered electrodes, which have enhanced rigidity due to both the sintered matrix and the physical, fused bonds between the metal particles. The expansion and contraction of both sintered and nonsintered electrodes during the hydriding/dehydriding process not only initially decreases the physical contact between the alloy particles with a resulting decreased conductivity, but ultimately causes the electrodes to fail due to physical deterioration and subsequent disintegration.

SUMMARY OF THE INVENTION

In an effort to overcome the problems associated with current hydrogen storage electrodes, a novel electrode has been prepared from a plurality of metallic hydride alloy fibers formed into a porous mat layered in random orientation with a high degree of fiber-to-fiber contact. The mat so produced can be used directly as a reversible hydrogen storage electrode in a secondary alkaline battery. The nonwoven mat is the electrode structure. The hydride alloy is metallic and conductive and electrical connection to the electrode can be made by resistance welding the connection member directly to the electrode mat. For instance, the connection member can be a metallic foil electrical tab.

The fibers used to form the mat possess high aspect ratios, i.e. the ratio of fiber length to diameter, which are typically greater than 1,000. The fiber diameters fall in the range of about 1 micron to about 20 microns, these fibers being alternatively described as microfiber filaments.

Electrodes made from mats of these fibers enjoy significant weight savings over conventional solid metal hydride electrodes since an auxiliary integral electrode substrate such as wire, foil, a frame or perforated sheet is not required to maintain the shape of the electrode. Also, the electrode has improved hydrogen storage capability and performance characteristics resulting from its microstructure and high porosity relative to solid electrodes. Because electrode manufacture processing is greatly simplified, cost savings are realized. Further, increased hydrogen storage capacity due to the increased surface area results in hydrogen storage alloy materials savings. Cost savings are also realized since electrode binders and supporting substrate structures are not needed.

It is therefore an object of the invention to provide a novel hydrogen storage electrode of simple construction and high porosity.

It is a further object of the invention to provide an electrode having improved mechanical strength, conductivity and dimensional stability.

It is a further object of the invention to provide an electrochemical hydrogen storage cell incorporating the novel hydrogen storage electrode.

These and other objects and advantages of the invention are described in more detail in the detailed description of the invention and of the drawings in which:

DETAILED DESCRIPTION OF THE INVENTION

Figure 1:
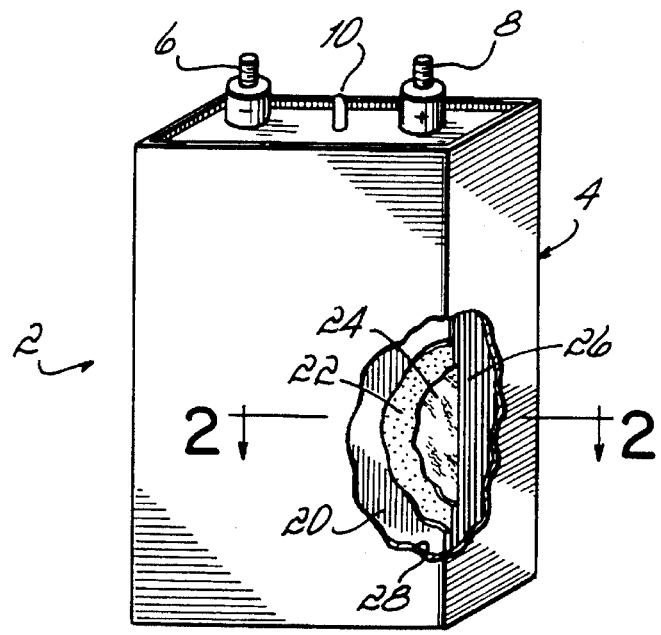
FIG. 1 is a perspective view of a hydrogen storage battery, partially cut away.

The invention in its broader aspects relates to a negative electrode for the storage of hydrogen comprising a porous mat of a plurality of conductive, metallic fibers layered in a random orientation, the fibers having a high aspect ratio; and an electrical connection member attached to the porous mat. Preferably, the connection member is attached directly to the mat, such as by resistance welding. The fibers comprising the porous mat have diameters in the range of about 1 micron to about 20 microns, more narrowly in the range of about 1 micron to about 10 microns, and preferably in the range of about 1 micron to about 3 microns. The fibers must be of a composition which is capable of reversible hydrogen storage.

Mats produced from the conductive metallic fibers are engineered to have porosities in the range of about 50% to about 90%. More narrowly, the porosity of the mat is in the range of about 75% to about 85%. Porosity is the percentage of the void volume divided by the total electrode volume. After determining the total electrode volume by multiplying the electrode area by its thickness, one calculates the void volume by subtracting the volume of the electrode alloy material from the total electrode volume. The electrode alloy volume is the electrode weight divided by alloy density.

The fibers have a relatively high aspect ratio, i.e., the ratio of fiber length to diameter. The aspect ratio of these fibers is greater than 1,000. Typically, the ratio is about 2,000. The metallic fibers are manufactured from substituted, multi-component metallic alloys capable of storing hydrogen, such as but not limited to nickel-titanium, lanthanum-nickel and mischmetal-nickel.

The porous mat comprising the electrode may be stiffened by an auxiliary integral electrode substrate such as a frame, wire, foil or porous plate in contact with the mat. Also, the mat may be stiffened by sintering. Further, secondary conductive materials can be added to the electrode matrix to improve mechanical strength, conductivity, dimensional stability, or corrosion/passivation resistance. These materials may include carbonyl nickel powder, high surface area carbon, graphite, or other similar metallic or conductive substances or structures which are added to the respective fibers during mat formation.

Alternatively, the negative electrode porous mat may be comprised of the conductive metallic fibers layered in random orientation, the fibers having a high aspect ratio, the porous mat absent an auxiliary integral electrode substrate; and an electrical connection attached directly to the porous mat. This porous mat will have the same properties of the mat described above, and the fibers may have a separate coating or plating thereon. Also, the same additives described above may be incorporated in the mat. However, the alternative porous mat would not include an auxiliary integral electrode substrate such as a frame, wire, foil or porous plate to serve as a support member.

Also contemplated by the invention is an electrochemical hydrogen storage cell comprising a positive metallic electrode; a negative electrode comprising a porous mat of a plurality of conductive, metallic fibers layered in a random orientation, the fibers having high aspect ratios; and a separator material layer positioned between the positive metallic electrode and the negative electrode. The positive metallic electrode is characterized as having electrochemically active material selected from the group consisting of nickel, nickel-hydroxide, silver, silver-oxide, manganese dioxide, and combinations thereof.

In regard to the negative electrode, the composition of the fibers can be any known, hydride-forming metallic alloy, of either the $AB_2$ or $AB_5$ types. For example, substituted alloys of nickel-titanium, iron-titanium, lanthanum-nickel, lanthanum-cobalt-nickel, among others, can be utilized. The fibers can be manufactured according to one of two distinct methods which have been previously applied to other materials such as nickel, copper and stainless steel. The two methods are the melt spinning process and the melt overflow process, and fibers produced according to these processes are currently being used for applications such as hot gas filtration in automobile air bags and as conductive fillers in EMI shielding applications.

In melt spinning, the metallic hydride alloys are fabricated into a rod having a typical diameter of about 0.25 to about 1.27 cm. The tip of that rod is heated to the melting point of the alloy by an induction coil. Fibers are spun from the pool of molten metal at the tip of the rod by a knife-edge spinning wheel. The fibers rapidly cool as they are ejected from the molten pool and thrown into the vacuum of the chamber. The spinning wheel is typically a high melting metal such as molybdenum. The knife-edge is finely machined to a point, which determines the resulting fiber diameter and uniformity. Also, the wheel must be true in rotation. The rod is advanced into the wheel as the fibers are spun out of the melt to keep the tip of the rod in contact with the wheel. The entire process is done under a vacuum to avoid oxidation of the metal by air at the processing temperatures, which are slightly above the melting point of the fiber-forming material. The resulting properties of the fiber, including diameter, length and crystal structure, are determined primarily by the wheel geometry, rotation speed, temperature of the molten pool of metal, diameter of the rod, rate of advancement of the rod into the wheel, and quenching rate.

The melt overflow process is generally similar to the melt spinning process, except that the fibers are extracted from a molten pool of metallic alloy which is prepared by induction melting the alloy directly from a cast ingot. A spinning wheel is also used to extract fibers from the melt. The process must be completed under a vacuum or in an inert gas atmosphere to avoid oxidation of the metal by air. This process has an advantage over melt spinning in that it is better suited to high volume production and thus would result in a lower fiber cost. The disadvantage is that the melt overflow process provides slightly less control over the finished product.

After the fibers are formed, they may be layered into a mat by several different methods utilizing either wet or dry processing. For example, a wet process similar to that used in paper making can be employed. In this instance, fibers are made into an aqueous slurry and introduced into a vacuum tray lined with filtered paper. The liquid is removed by vacuum, leaving a flat layer of randomly oriented fibers on the filter paper layer. Conductive or non-conductive binders can be used in the slurry to help hold the mat together prior to sintering, if this is employed. The wet pasted fiber mat is then sintered in an inert atmosphere, typically argon, by heating the mat to a temperature just below the melting point of the hydride alloy. The sintering process essentially welds the fibers within the mat together into a rigid, high mechanical strength structure. Each point in the mat where one fiber touches another forms a micro spot welded joint. A mat is formed by a dry layering process by merely placing the fibers into a form or mold of the desired size and shape. Conductive binders, such as high surface area nickel powder, carbon fibers or graphite powder can be added at that time to the fibers. The form or mold is essentially a rectangular stainless steel box having adjustable sides so that the height can be adjusted to yield the desired electrode mat thickness. The form or mold is vibrated from below to settle the fibers into a more dense packing arrangement. The form is slightly overfilled with fibers and the excess is raked off with a straight edge passed over the form and resting on the side rails. This mat is then placed on the carrier plate and sintered in an oven under an inert atmosphere. A finished negative electrode is then formed by cutting the rigid mat into the proper size and placing an electrical connection thereon for ultimate attachment to the negative cell terminal to complete the circuit. The electrical connection is welded directly onto the mat, or can be attached by other means.

The hydrogen storage battery is formed by placing the porous hydride electrode in a container with a positive electrode, i.e. a cathode, made from a conventional nickel or silver electrode, with a suitable separator material between the negative and positive electrodes. The separator is typically a layer of nylon, polypropylene, or zirconium-oxide cloth, among others, which are resistant to the effect of the electrolyte, but which allow passage of the electrolyte therethrough. Typical thickness is about 0.025 cm. Additives or other treatments may be used to modify the separator. The battery is activated with aqueous potassium hydroxide typically having about 26 to about 35% potassium hydroxide by weight. The combination forms an alkaline rechargeable electrochemical battery.

The battery is charged by polarizing the battery with an external source of DC electricity, observing the electrical polarity of the battery terminals with respect to the power source; i.e., positive battery terminal to positive pole of the power source and negative to negative. As the battery is charged, the hydride fiber mat electrode is cathodically polarized, and an electrochemical reaction is induced in which water in the electrolyte is broken down into mono-and diatomic hydrogen and hydroxide ions. The hydrogen thus generated is stored within the fiber hydride electrode as a solid metallic hydride, at low pressure, typically less than 5 atmospheres.

When the battery is discharged, the hydrogen stored in the electrode fibers is oxidized to reform water, in combination with the hydroxide ions in the electrolyte solution. The battery is discharged by connecting a load between the battery terminals, thus producing an electrical current by the energy stored in the battery during the charging process. The hydride fiber electrode is thus anodically polarized, providing electrons to the external circuit. The electrical current thus produced is capable of doing work.

During charging and discharging, the positive electrode performs its conventional role, as in any alkaline rechargeable battery, to complete the circuit of the battery.

Referring to the drawings, FIG. 1 shows a battery 2 which is defined externally by battery casing 4, electrical connection posts 6 and 8, and gas vent 10. Alternatively, the battery 2 may be a sealed cell, such as for slow charge rate or low current applications, and a vent would not be required. For convenience, connection post 6 will be identified as the negative post, and connection post 8 the positive post.

Figure 2:
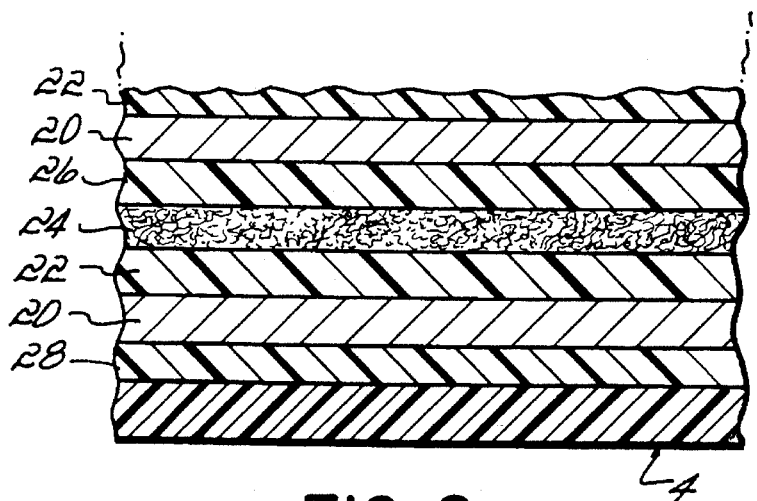
FIG. 2 is a fragmentary view generally depicting the respective battery components taken across line of sight 2—2 from FIG. 1.

Inside battery casing 4 is a plurality of electrode plates and separator pads as shown in more detail in FIG. 2. The casing 4 may be plastic, such as nylon or polypropylene, or may be a metal such as stainless steel.

Disposed inwardly from the battery casing 4 shown in FIG. 2, is a positive electrode 20, a separator layer 22, a negative electrode 24, and a second separator layer 26. An additional separator layer 28 is interposed between the positive electrode 20 and the battery casing 4 as an insulator. Such an insulating layer would also be employed elsewhere as needed along the inside perimeter of the battery casing 4. The above sequence of electrodes and separator layers is then repeated throughout the remaining internal volume of the battery 2 to create a rechargeable hydrogen battery. The individual negative and positive electrodes may be connected in series or in parallel as desired and then separately connected to connection posts 6 and 8.

Figure 3:
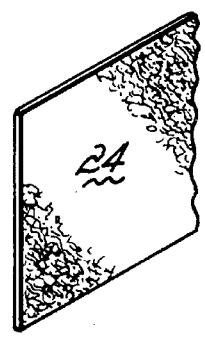
FIG. 3 is a perspective view of the fibrous negative electrode showing the metallic fibers layered in random orientation.

FIG. 3 shows a mat of the conductive, metallic fibers layered in random orientation. The typical fiber diameter is about 1 micron, though higher diameters can be used. The typical aspect ratio is about 2000. Thus a 1 micron diameter fiber would have a length of about 2 millimeters (mm). Typically, a gram of fiber material would include about $1.8 \times 10^7$ fibers.

The estimated surface area of a mat made of 1 micron diameter fibers would be approximately 2270 $cm^2/g$. This number can be increased by the use of additives incorporated into the mat during manufacture. In comparison, a conventional compressed powder sintered electrode has a surface area of about 10–20 $cm^2/g$. This difference is important when considering the process of hydrogen storage. Hydrogen must diffuse into and through the metallic alloy for hydrogen storage to occur. This is a physical process, requiring mass transport of hydrogen atoms into the metal. This diffusion requires the physical movement of hydrogen atoms which requires time and energy, and involves movement over a distance. Most hydrogen is necessarily bound relatively near the surface of the electrode, within the first few atomic layers. This occurs because as hydrogen is absorbed into the metal, it indiscriminately bonds to the first available bonding site which it encounters. Therefore, the hydrogen-bonding sites nearest the surface are the first to fill. This impedes further diffusion of hydrogen deeper into the metal by obstructing the hydrogen paths into the metal and creating a more tortuous path for later hydrogen atoms to pass through. As a result, the quantity of hydrogen a given alloy is capable of readily storing is restricted. In comparison, the porous mat electrode has a higher surface area and morphology which significantly increases the quantity of hydrogen which can be stored by a given hydrogen storage alloy. The diameter of the alloy fiber greatly reduces the distance over which the hydrogen atoms must diffuse. This reduction in diffusion distance improves the electrode kinetics. Also, there is an exponential increase in the number of hydrogen-bonding sites near the metal surface throughout the electrode surface.

The layering of the long metallic fibers, particularly in the random orientation, provides maximal contact between fibers and therefore maximum mechanical strength and structural integrity. The electrode mat can be sintered to further increase the conductivity and mechanical strength of the structure by fusing the fibers together at the multitude of fiber-fiber contact points within and throughout the non-woven mat structure. The improvement in conductivity could also include the addition of certain conductive materials such as nickel or copper used in conjunction with the sintering operation.

Another adjunct addition is the micro-encapsulation and micro plating, or micro plating alone, of the non-woven electrode mat with a discrete metallic coating. This metallic coating can be comprised of rhenium, iron, ruthenium, cobalt, rhodium, nickel, palladium, platinum, copper, silver, gold, indium, tin, aluminum or combinations of these elements. The coating provides important benefits including corrosion and passivation protection for the hydrogen storage alloy, as well as providing hydrogen adsorption and desorption sites at the electrode structure surfaces. Hydrogen exists as a diatomic molecule and must be dissociated into monatomic, elemental hydrogen atoms before being bound into the hydrogen storage alloy. A micro-layer metallic coating of the above elements or combinations of elements provides absorption sites for the diatomic hydrogen for subsequent dissociation into monatomic hydrogen at the electrode surface. The coating thus would increase electrode efficiency and greatly improve the electrode kinetics at the electrode-electrolyte-gas interface.

The typical thickness of the porous electrode mat is approximately 0.05–0.076 cm, though thicknesses outside this range may be formed as circumstances warrant.

Besides having utility in a battery, a porous mat made of conductive, metallic fibers produced from hydrogen storage alloys could also be used in commercial non-electrochemical hydrogen storage applications to store hydrogen at low pressure. In comparison, cylindrical steel tanks are used to store hydrogen at high pressure, and cryogenic systems are used to store hydrogen in the liquid form. Solid hydride alloy hydrogen storage has the advantages of efficiency and lower cost relative to the above two systems.

Thus is disclosed a porous mat useful, for example, in constructing an electrode, and thereby as a component of a battery, and while the invention has been described in conjunction with specific embodiments thereof, it is evident that many alternatives, modifications, and variations will be apparent to those skilled in the art in light of the foregoing description. Accordingly, departures may be made from such details without departing from the spirit or scope of the general inventive concept.

What is claimed is:

1. A negative electrode for the storage of hydrogen comprising:
    a porous mat of a plurality of conductive, metallic hydride alloy fibers layered in a random orientation; and
    an electrical connection member attached to said porous mat.

2. The negative electrode of claim 1 wherein said electrical connection member is attached directly to said porous mat.

3. The negative electrode of claim 1 wherein said fibers have diameters in the range of about one micron to about 20 microns.

4. The negative electrode of claim 3 wherein said fibers have diameters in the range of about 1 micron to about 3 microns.

5. The negative electrode of claim 1 wherein said mat has a porosity in the range of about 50% to about 90%.

6. The negative electrode of claim 5 wherein said mat has a porosity in the range of about 75% to about 85%.

7. The negative electrode of claim 1 wherein said fibers have an aspect ratio greater than 1000.

8. The negative electrode of claim 7 wherein said fibers have an aspect ratio of about 2000.

9. The negative electrode of claim 1 wherein said porous mat is sintered.

10. A negative electrode for the storage of hydrogen comprising:
    a porous mat comprised of conductive, metallic hydride alloy fibers layered in a random orientation, said porous mat absent an auxiliary integral electrode substrate; and
    an electrical connection member attached directly to said porous mat.

11. The negative electrode of claim 10 wherein said fibers are coated with a material selected from the group consisting of nickel, copper, and combinations thereof.

12. The negative electrode of claim 10 wherein said fibers have diameters in the range of about one micron to about 20 microns.

13. The negative electrode of claim 12 wherein said fibers have diameters in the range of about 1 micron to about 3 microns.

14. The negative electrode of claim 10 wherein said mat has a porosity in the range of about 50% to about 90%.

15. The negative electrode of claim 14 wherein said mat has a porosity in the range of about 75% to about 85%.

16. The negative electrode of claim 10 wherein said fibers have an aspect ratio greater than 1000.

17. The negative electrode of claim 16 wherein said fibers have an aspect ratio of about 2000.

18. The negative electrode of claim 10 wherein said porous mat is sintered.

19. An electrochemical hydrogen storage cell comprising:
    a positive metallic electrode;
    a negative electrode comprising a porous mat of a plurality of conductive, metallic hydride alloy fibers layered in a random orientation; and
    a separator material layer positioned between said positive metallic electrode and said negative electrode.

20. The storage cell of claim 19 wherein said positive metallic electrode is selected from the group consisting of nickel, nickel-hydroxide, silver, silver-oxide, manganese dioxide, and combinations thereof.

* * * * *